(12) United States Patent
Sugahara

(10) Patent No.: US 6,466,619 B1
(45) Date of Patent: *Oct. 15, 2002

(54) DECODING APPARATUS FOR PROTECTION OF DATA REPRODUCTION ACCORDING TO BOTH PROTECTION DATA AND APPARATUS PROTECTION DATA

(75) Inventor: Takayuki Sugahara, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/991,713

(22) Filed: Nov. 26, 2001

Related U.S. Application Data

(60) Continuation of application No. 09/469,499, filed on Dec. 21, 1999, which is a division of application No. 08/391,861, filed on Feb. 22, 1995, now abandoned.

(30) Foreign Application Priority Data

Feb. 22, 1994 (JP) .............................................. 6-47762

(51) Int. Cl.[7] .............................................. H04N 7/12
(52) U.S. Cl. .................................... 375/240.01; 386/94
(58) Field of Search ...................... 375/240.01, 240.25, 375/240.26; 386/94; H04N 7/12

(56) References Cited

U.S. PATENT DOCUMENTS

| | | | |
|---|---|---|---|
| 4,595,950 A | 6/1986 | Lofberg | 380/5 |
| 4,685,131 A | 8/1987 | Horne | 380/20 |
| 5,036,537 A | 7/1991 | Jeffers et al. | 380/20 |
| 5,191,611 A | 3/1993 | Lang | 380/25 |
| 5,214,556 A | 5/1993 | Kilbel | 360/137 |
| 5,315,448 A | 5/1994 | Ryan | 386/94 |
| 5,321,750 A | 6/1994 | Nadan | 380/20 |
| 5,323,244 A | 6/1994 | Yamaguchi et al. | 386/94 |
| 5,434,623 A | 7/1995 | Coleman et al. | 348/405 |
| 5,434,678 A | 7/1995 | Abecassis | 386/52 |
| 5,463,565 A | 10/1995 | Cookson et al. | 348/396 |

FOREIGN PATENT DOCUMENTS

| | | |
|---|---|---|
| DE | 33 14783 | 10/1984 |
| EP | 0 503 519 | 9/1992 |
| EP | 0 553 545 | 8/1993 |
| EP | 0 580 367 A2 | 1/1994 |
| GB | 2 209 417 | 5/1989 |
| JP | 5-158531 | 10/1993 |
| JP | 5-347744 | 12/1993 |
| WO | WO 90/13118 | 11/1990 |

OTHER PUBLICATIONS

International Standards for Multimedia Encoding, Chapter 6, Yasuda, Maruzen Co., (cited at pp. 9–10 of original specification).

*Primary Examiner*—Young Lee
(74) *Attorney, Agent, or Firm*—Israel Gopstein; Clark & Brody

(57) ABSTRACT

In a reproduction apparatus, for reproducing an original signal conveyed as main data by a data medium such as a recording disk or broadcasting system, with medium protection data which are specific to the data medium being conveyed together with the main data, the apparatus includes a section for generating apparatus protection data which are specific to the reproduction apparatus, a section for combining the apparatus protection data with the medium protection data to define a protection level, and a section for applying the protection level to restrict reproduction of the original signal, with stepwise variations in restriction occurring in accordance with changes in protection level. The medium protection data may include information for specifying restricted reproduction of portions of the original signal, such as by producing degraded resolution within specified regions of specified frames of a video signal.

4 Claims, 16 Drawing Sheets

FIG. 2

REPRODUCTION APPARATUS
PROTECTION LEVEL → STRONG

MEDIUM PROTECTION LEVEL ↓ STRONG

|   | 1 | 2 | 3 | 4 |
|---|---|---|---|---|
| 1 | A | A | A | A |
| 2 | A | A | A | B |
| 3 | A | A | B | C |
| 4 | A | B | C | D |
| 5 | E | E | E | E |

FIG. 3

MEDIUM PROTECTION LEVEL →

| EXAMPLES OF MEDIUM PROTECTION | 1 | 2 | 3 | 4 | 5 |
|---|---|---|---|---|---|
| BASED ON U.S. MOVIE RATINGS | FREE | PG | R | X | OTHER |
| BASED ON COPYRIGHT PROTECTION | FREE | RESTRICTED (WEAK) | RESTRICTED (MODERATE) | RESTRICTED (STRONG) | OTHER |

FIG. 4

APPARATUS PROTECTION LEVEL →

| EXAMPLES OF PLAYBACK APPARATUS PROTECTION | 1 | 2 | 3 | 4 |
|---|---|---|---|---|
| BASED ON COUNTRY | U.S.A. | EUROPE | JAPAN | TAIWAN |
| BASED ON ADULT/CHILD STATUS | FOR ADULTS | FOR ADULTS | FOR ADULTS | FOR CHILDREN |
| BASED ON OBJECTIVES | FOR ITEMS TO BE SOLD | FOR ITEMS TO BE SOLD | FOR IN-STORE SALES DEMONSTRATION ITEMS | FOR IN-STORE SALES DEMONSTRATION ITEMS |

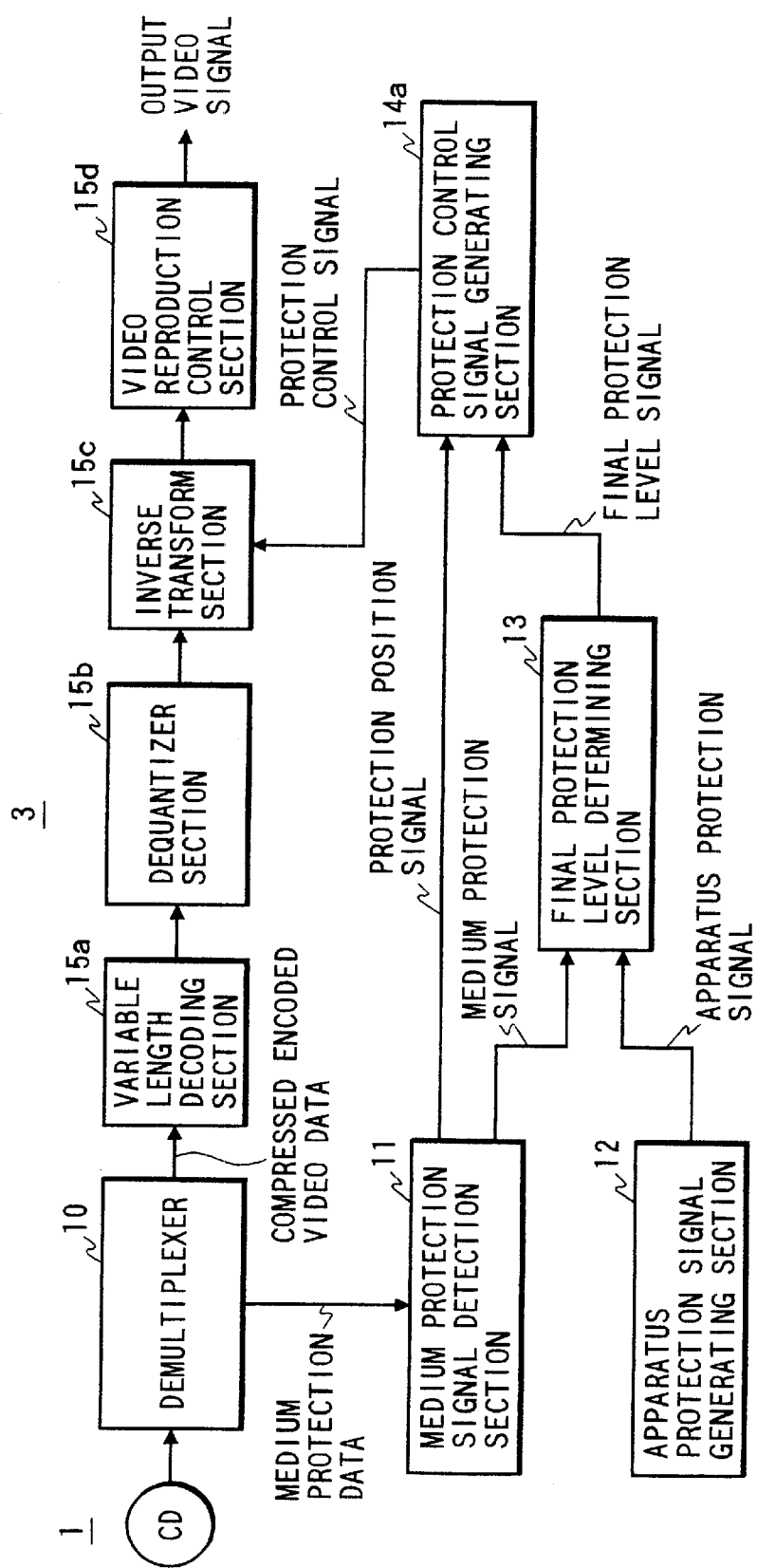

FIG. 6

| | EXAMPLE OF VISIBILITY GRADES, USING SPATIAL-DOMAIN PROTECTION CONTROL | EXAMPLE OF VISIBILITY GRADES, USING TIME-AXIS PROTECTION CONTROL | EXAMPLE OF VISIBILITY GRADES, USING PROTECTION BASED ON VIDEO DATA BIT-NUMBER CONTROL |
|---|---|---|---|
| A | ALL PICTURE IS VISIBLE | ALL PICTURE IS VISIBLE | ALL PICTURE IS VISIBLE |
| B | 8×8 TRANSFORM BLOCK SIZE, DC COEFFICIENT AND 2 AC COEFFICIENTS | 1 IN 15 FRAMES USED | 4 BITS/SAMPLE |
| C | 8×8 TRANSFORM BLOCK SIZE, ONLY DC COEFFICIENT | 1 IN 60 FRAMES USED | 2 BITS/SAMPLE |
| D | 16×16 TRANSFORM BLOCK SIZE, ONLY DC COEFFICIENT | SPECIFIED FRAME(S) ONLY USED | 1 BIT/SAMPLE |
| E | OTHER PICTURE DISPLAYED | OTHER PICTURE DISPLAYED | OTHER PICTURE DISPLAYED |

FINAL PROTECTION LEVEL →

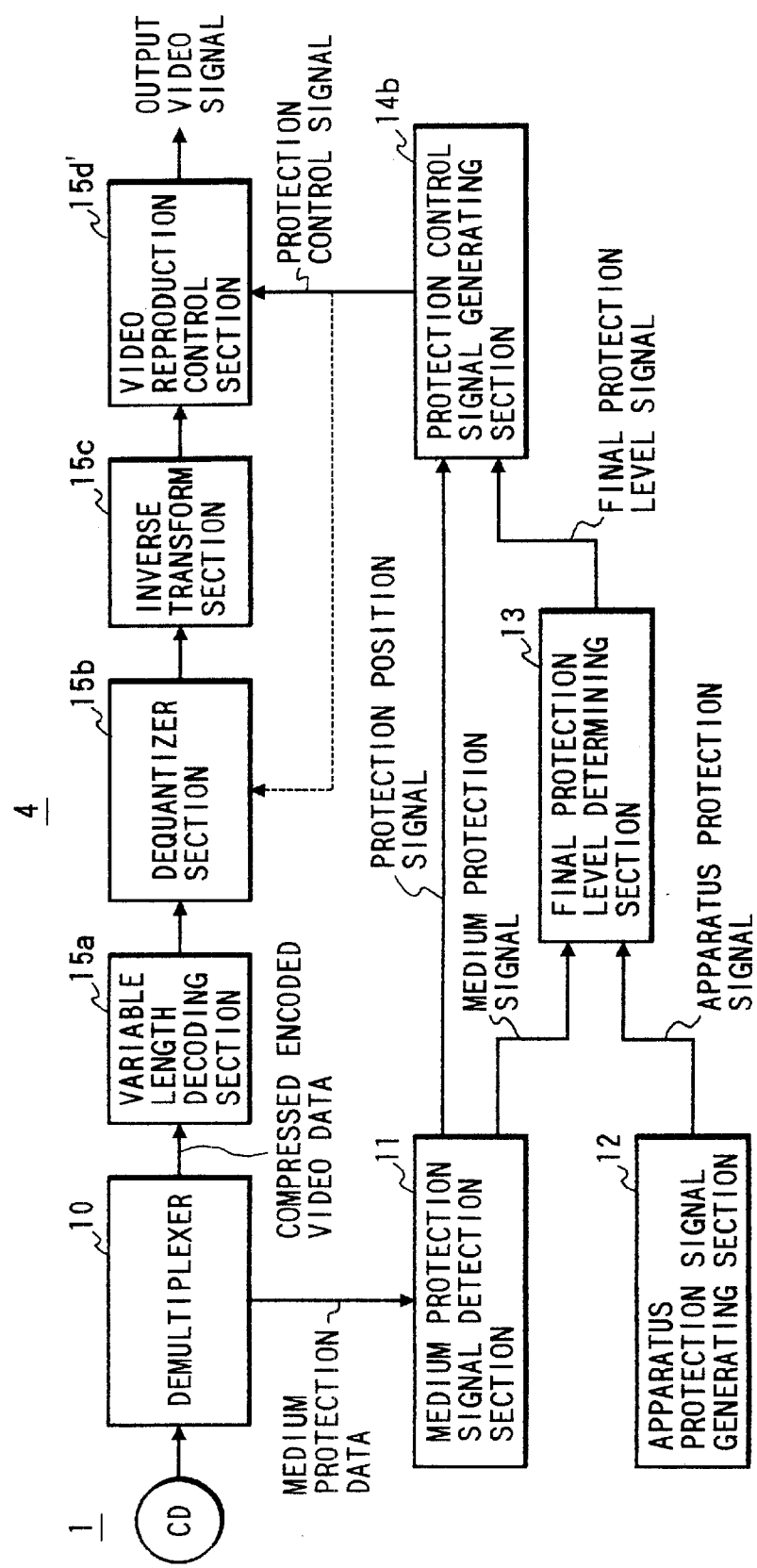

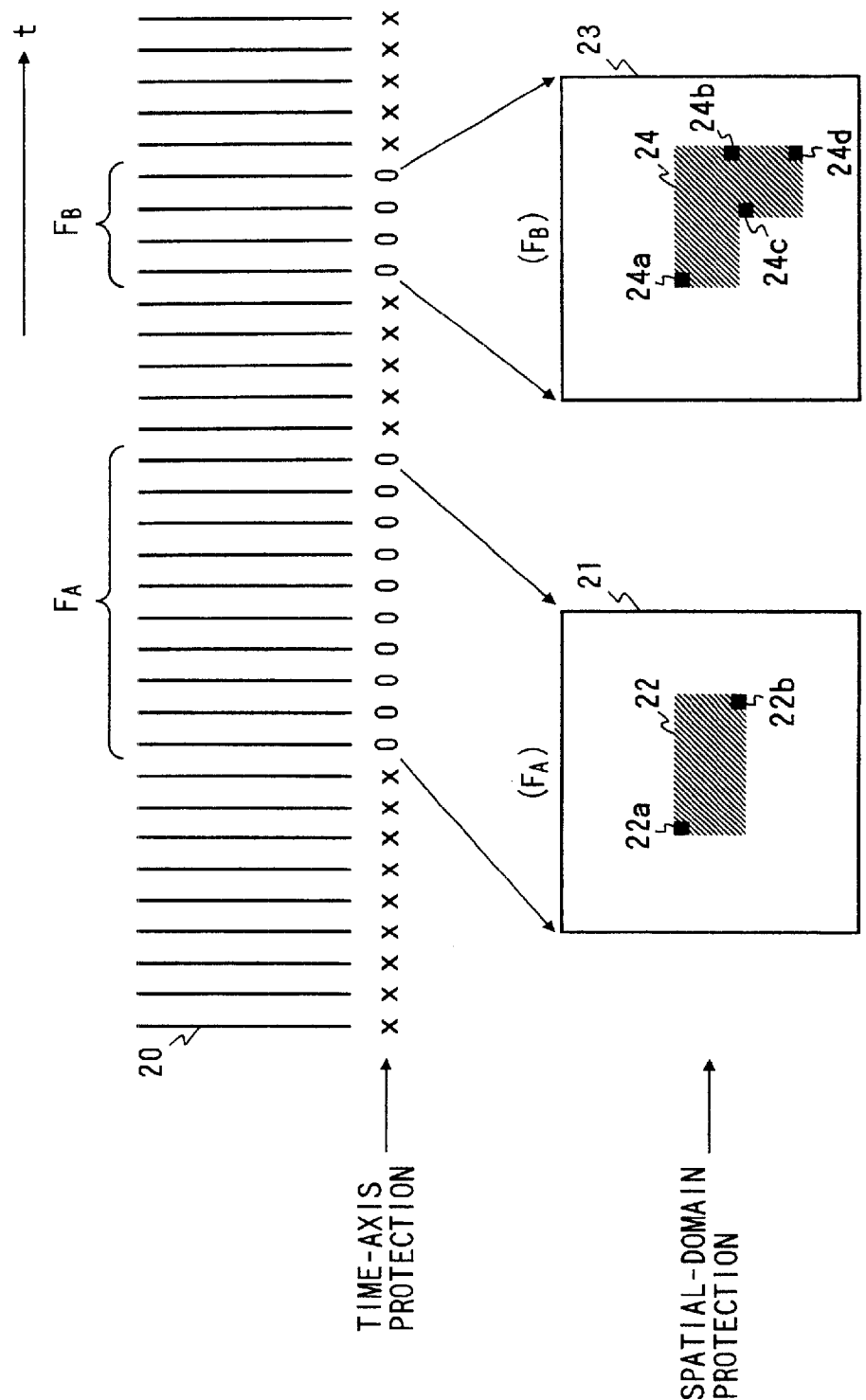

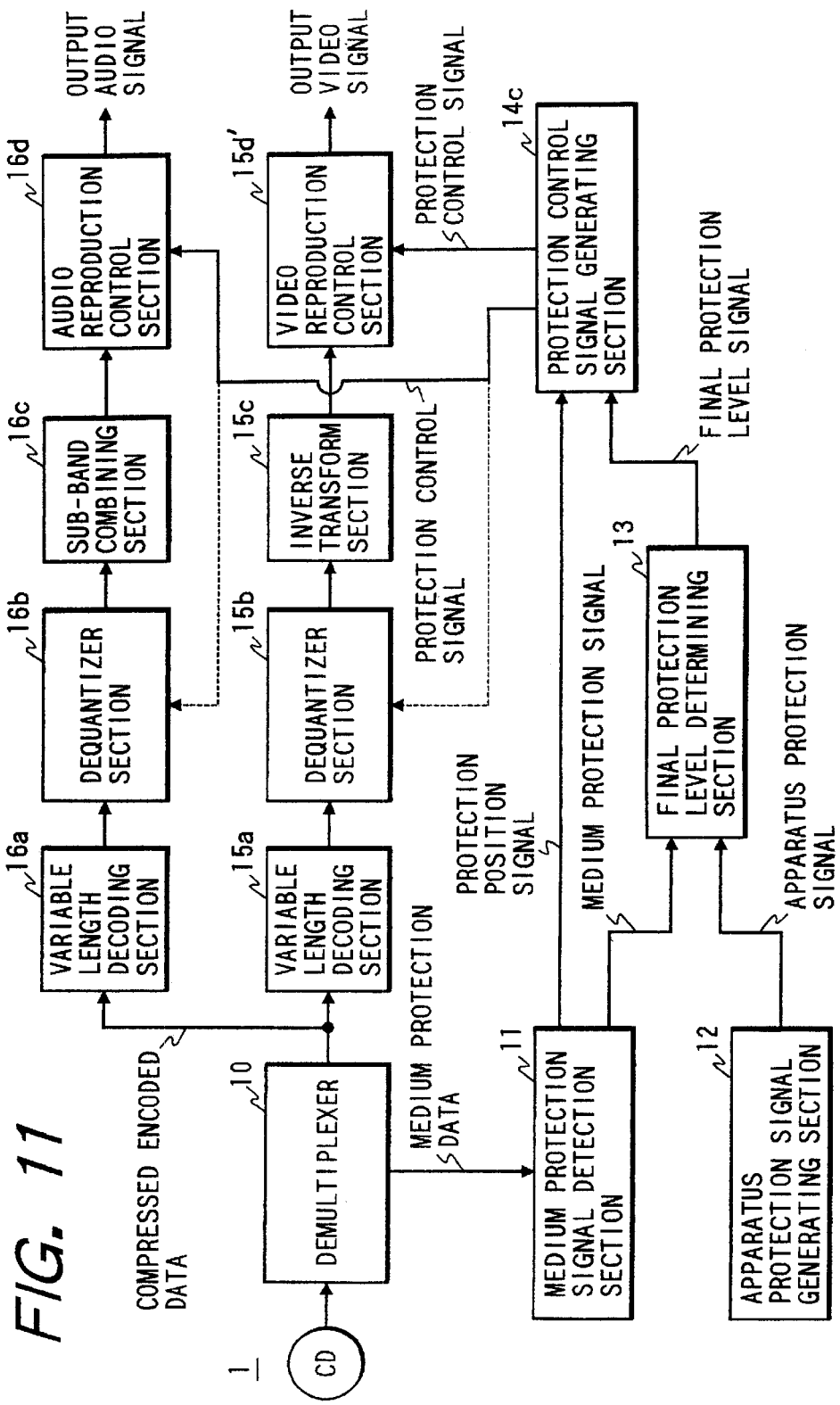

FIG. 12

| | EXAMPLE OF AUDIBILITY GRADES, USING BANDWIDTH-RESTRICTION PROTECTION CONTROL | EXAMPLE OF AUDIBILITY GRADES, USING TIME-AXIS PROTECTION CONTROL | EXAMPLE OF AUDIBILITY GRADES, USING PROTECTION BASED ON AUDIO DATA BIT-NUMBER CONTROL |
|---|---|---|---|
| A | ALL OF ORIGINAL AUDIO SIGNAL REPRODUCED | ALL OF ORIGINAL AUDIO SIGNAL REPRODUCED | ALL OF ORIGINAL AUDIO SIGNAL REPRODUCED |
| B | 18 KHz | 1 IN EVERY 2 SAMPLES IS USED | 12 BITS/SAMPLE |
| C | 12 KHz | 1 IN EVERY 3 SAMPLES IS USED | 8 BITS/SAMPLE |
| D | 6 KHz | ONLY SPECIFIED SAMPLES ARE USED | 4 BITS/SAMPLE |
| E | NO AUDIO OUTPUT SIGNAL | NO AUDIO OUTPUT SIGNAL | NO AUDIO OUTPUT SIGNAL |

FINAL PROTECTION LEVEL →

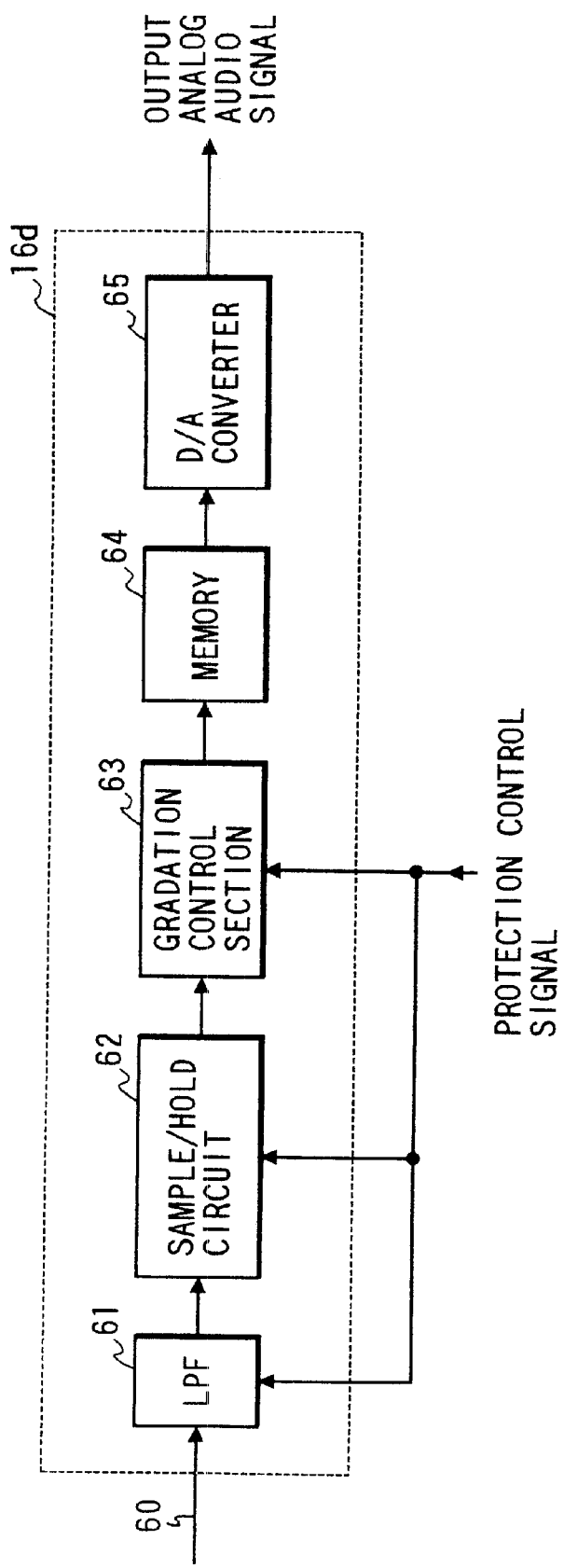

FIG. 14

REPRODUCTION APPARATUS
PROTECTION LEVEL
→ STRONG

MEDIUM PROTECTION LEVEL ↓ STRONG

|   | 1 | 2 | 3 | 4 |
|---|---|---|---|---|
| 1 | A~E | A~E | A~E | A~E |
| 2 | A~E | A~E | A~E | B~E |
| 3 | A~E | A~E | B~E | C~E |
| 4 | A~E | B~E | C~E | D~E |
| 5 | E~E | E~E | E~E | E~E |

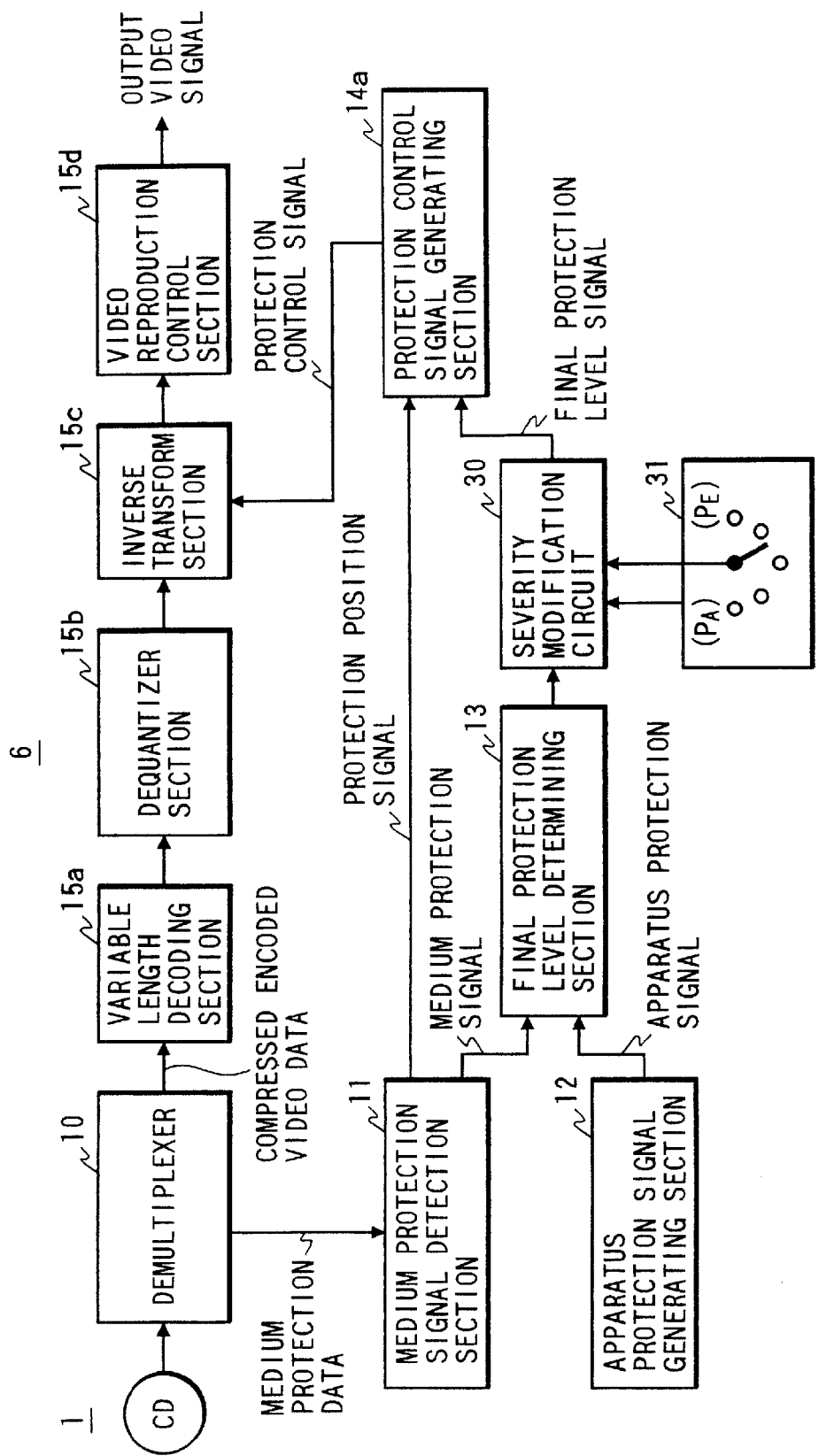

FIG. 16

(WHEN APPARATUS PROTECTION LEVEL = 1)

| | MODIFICATION SWITCH CONDITION | | | | |
|---|---|---|---|---|---|
| | $P_A$ | $P_B$ | $P_C$ | $P_D$ | $P_E$ |
| 1 | A | B | C | D | E |
| 2 | A | B | C | D | E |
| 3 | A | B | C | D | E |
| 4 | A | B | C | D | E |
| 5 | E | E | E | E | E |

MEDIUM PROTECTION LEVEL → STRONG (A)

(WHEN APPARATUS PROTECTION LEVEL = 2)

| | MODIFICATION SWITCH CONDITION | | | | |
|---|---|---|---|---|---|
| | $P_A$ | $P_B$ | $P_C$ | $P_D$ | $P_E$ |
| 1 | A | B | C | D | E |
| 2 | A | B | C | D | E |
| 3 | A | B | C | D | E |
| 4 | B | B | C | D | E |
| 5 | E | E | E | E | E |

MEDIUM PROTECTION LEVEL → STRONG (B)

(WHEN APPARATUS PROTECTION LEVEL = 3)

| | MODIFICATION SWITCH CONDITION | | | | |
|---|---|---|---|---|---|
| | $P_A$ | $P_B$ | $P_C$ | $P_D$ | $P_E$ |
| 1 | A | B | C | D | E |
| 2 | A | B | C | D | E |
| 3 | B | B | C | D | E |
| 4 | C | C | C | D | E |
| 5 | E | E | E | E | E |

MEDIUM PROTECTION LEVEL → STRONG (C)

(WHEN APPARATUS PROTECTION LEVEL = 4)

| | MODIFICATION SWITCH CONDITION | | | | |
|---|---|---|---|---|---|
| | $P_A$ | $P_B$ | $P_C$ | $P_D$ | $P_E$ |
| 1 | A | B | C | D | E |
| 2 | B | B | C | D | E |
| 3 | C | C | C | D | E |
| 4 | D | D | D | D | E |
| 5 | E | E | E | E | E |

MEDIUM PROTECTION LEVEL → STRONG (D)

DECODING APPARATUS FOR PROTECTION OF DATA REPRODUCTION ACCORDING TO BOTH PROTECTION DATA AND APPARATUS PROTECTION DATA

This application is a continuation of application Ser. No. 09/469,499 filed Dec. 21, 1999, which is a division of application Ser. No. 08/391,861 filed Feb. 22, 1995, abandoned.

BACKGROUND OF THE INVENTION

1. Field of the Invention

The present invention relates to a data reproduction protection method, and a data reproduction apparatus for implementing such a protection method, whereby reproduction of a signal represented by digital data such as a recorded digital video signal can be selectively restricted.

2. Description of the Prior Art

In the following, the term "data medium" is to be understood in a very general sense, as applying for example to broadcasting systems which transmit data such as video and/or audio data, in which case the received data may be the object of reproduction protection, and as applying also to any type of recording medium such as recording disks or tapes, etc., in which case playback data derived from the recording medium may be the object of reproduction protection. The reproduction protection may serve to selectively restrict viewing, hearing or copying of the data.

In the prior art, various types of reproduction protection method have been applied in fields such as CATV (cable television) and satellite television broadcasting. One method is to execute scrambling processing of transmitted video and audio data, and to insert a copyright code into the data, for thereby dividing the data into portions which can be freely reproduced and portions for which a fee must be paid in order to reproduce the data. When a program for which payment of a fee is necessary is received by a receiving apparatus, the program can be unscrambled and reproduced only if specified payment conditions are satisfied.

In the case of recorded media, one method of reproduction protection which is applicable to the DAT (digital audio tape recorder) recording system is the SCMS (serial copy management system). With that method, the playback DAT signal from a DAT playback apparatus has a main ID (identification) number which includes a copy inhibit code, whereby a single [copy enable—copy inhibit] sequence is ensured, so that a user can only make a single copy of a pre-recorded digital audio tape.

However with such prior art methods of reproduction protection there are only two control possibilities, i.e. reproduction is made either possible or impossible. It has not been possible hitherto to provide a gradually varying degree of restriction of reproduction of a signal conveyed by a data medium. Thus, such a reproduction protection method can only be used for a single purpose, e.g. for management of payment fees, or for copyright protection. Moreover with such a prior art reproduction protection method, since the data which are to be protected exist only in a transmitting medium or recording medium prior to being reproduced, it has not been possible to provide a varying degree of limitation of reproduction capability in accordance with some condition of the reproduction apparatus. Thus in some cases, the degree of protection may be excessively severe, or excessively lax, so that it is difficult to achieve an effective degree of protection. For example, certain types of scenes recorded on a video tape may be permitted to be viewed in a certain country, such as the U.S.A., but may not be permissible in other countries. It would thus be advantageous to ensure that when that video tape is played on a reproduction apparatus which is sold to the public in such other countries, reproduction protection is automatically applied such that the aforementioned scenes will not be reproduced, or will not be clearly reproduced. However in the prior art, such a feature has not been possible.

SUMMARY OF THE INVENTION

It is an objective of the present invention to overcome the problems of the prior art set out above, by providing a reproduction protection method and apparatus whereby information specifying a degree of restriction of reproduction of an original signal is conveyed (e.g. by a recording medium or signal transmission medium) together with data expressing the original signal, whereby information specifying a degree of restriction of reproduction of the original signal are generated by a reproduction apparatus which operates on the conveyed data, and whereby information specifying a degree of restriction which is actually applied to reproduction of the original signal is derived based on a combination of the restriction information conveyed by the data medium and the restriction information generated by the reproduction apparatus.

More specifically, the invention provides a reproduction protection method comprising: attaching medium protection data to main data which are conveyed by a data medium, said main data representing an original signal;

supplying the main data and medium protection data, via the data medium, to a reproduction apparatus;

generating apparatus protection data by the reproduction apparatus;

determining a protection level by combining the medium protection data and the apparatus protection data; and controlling the reproduction apparatus to utilize the main data to reproduce the original signal in accordance with the protection level.

It is a further objective of the invention to overcome the above problems by providing a reproduction apparatus providing reproduction protection, for operating on main data representing an original signal and medium protection data expressing a medium protection level, said main data and medium protection being conveyed by a data medium, the apparatus comprising:

means for detecting said medium protection data to obtain a medium protection signal expressing said medium protection level;

means for generating an apparatus protection signal expressing an apparatus protection level which has been assigned to said reproduction apparatus;

means responsive to said medium protection signal and apparatus protection signal for determining a final protection level in accordance with a combination of said medium protection level and apparatus protection level;

means for executing reproduction of said original signal by utilizing said main data, including means for selectively restricting said reproduction in accordance with said final protection level.

With such a method and apparatus for reproduction protection, the protection level can be determined in accordance with the medium protection data, and hence can be determined in accordance with the wishes of the manufacturer of the data medium, or of the copyright owner of the main data. In addition, the protection level which is actually applied (i.e. the final protection level) is also determined in accordance with the apparatus protection data, which can be specified by the manufacturer or the seller of the reproduction apparatus. As a result, when the main data are to be reproduced (for example, during playback of a recording disk or tape), a graduated degree of limitation of reproduction is implemented, with that degree of limitation being determined by the final protection level, i.e. being determined in accordance with a combination of the requirements of the data medium manufacturer or the copyright owner of the main data and the requirements of the manufacturer or seller of the reproduction apparatus. In that way, considerable flexibility can be ensured in selectively restricting reproduction of signals which are conveyed for example by recording disks or tapes or by broadcasting systems.

In particular, the invention enables such reproduction restriction to be applied to specific frames or sequences of frames of a video signal, or to specific regions within each of a sequence of frames.

BRIEF DESCRIPTION OF THE DRAWINGS

FIG. 2 is a matrix diagram showing an example of how final protection levels are determined in a reproduction apparatus according to the present invention;

FIG. 3 shows specific examples of how medium protection levels can be assigned;

FIG. 4 shows specific examples of how apparatus protection levels can be assigned;

FIG. 5 is a general system block diagram of a second embodiment, which is a specific configuration for the apparatus of FIG. 1, wherein protection control is applied to a data decompression section;

FIG. 6 shows examples of relationships between final protection level values and video picture visibility grades, for three different methods of protection control of a video signal;

FIG. 7 is a general system block diagram of a third embodiment, which is a specific configuration for the apparatus of FIG. 1, wherein protection control is applied to a video reproduction control section;

FIG. 8 is a conceptual diagram for describing how time-axis protection and spatial-domain protection control can be applied to a video signal with the present invention;

FIG. 11 is a general system block diagram of a fourth embodiment, which is a specific configuration for the apparatus of FIG. 1, wherein protection control is applied to a video reproduction control section and also to an audio reproduction control section;

FIG. 12 shows examples of relationships between final protection level values and audio signal audibility grades, for three different methods of protection control;

FIG. 13 is a block diagram of an example of the internal configuration of an audio reproduction control section in the embodiment of FIG. 11;

FIG. 14 is a matrix diagram for illustrating how variable ranges can be defined for final protection level values, by a fifth embodiment of the invention;

FIG. 15 is a general system block diagram of the fifth embodiment, wherein a final protection level can be modified by operation of a switch provided on the reproduction apparatus; and FIG. 16 shows relationships between medium protection level values and settings of a modification switch in the embodiment of FIG. 15, for each of respective values of the apparatus protection level.

DESCRIPTION OF PREFERRED EMBODIMENTS

Figure 1:
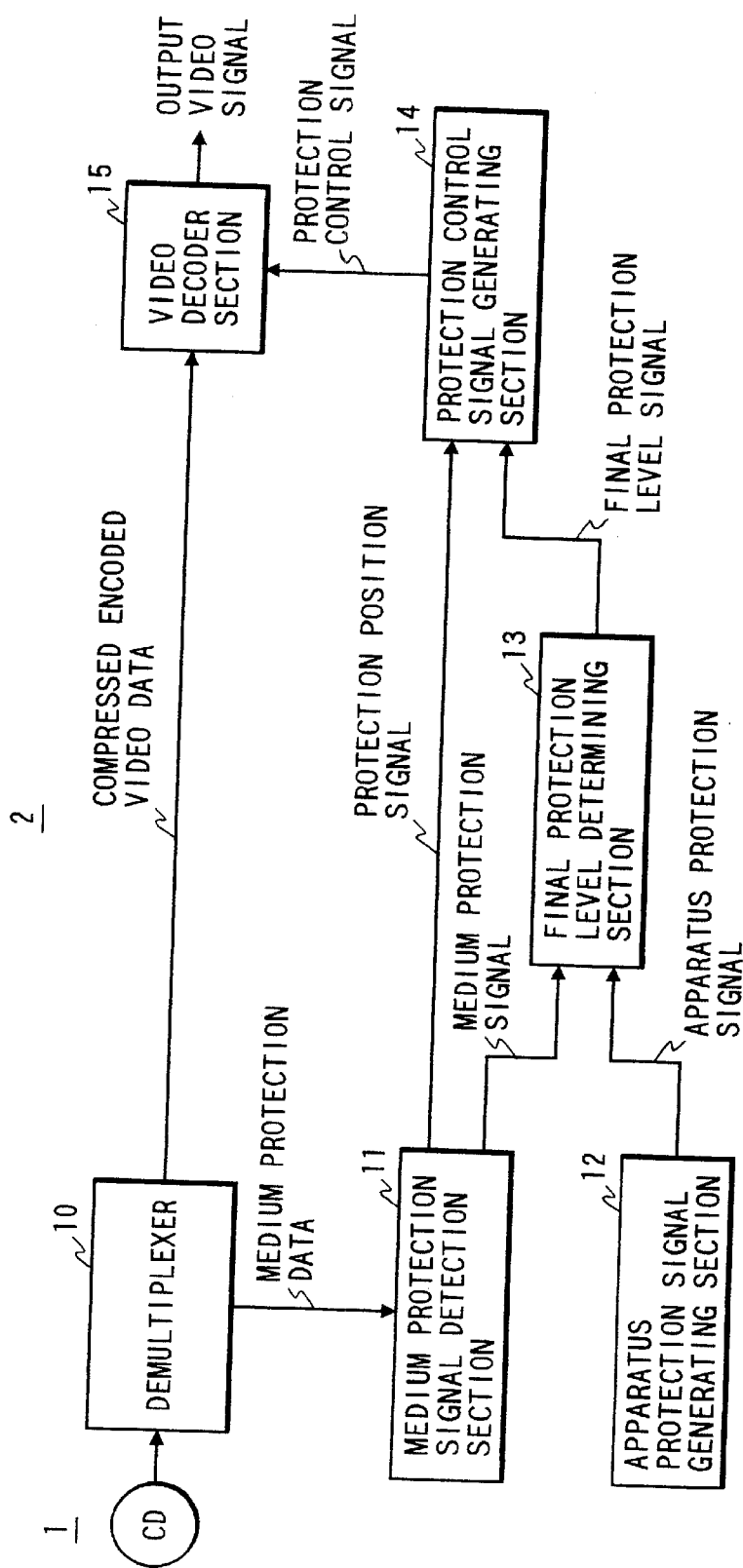
FIG. 1 is a general system block diagram of a first embodiment of the invention, which is a CD player providing reproduction protection in accordance with the present invention, for use in describing the basic principles of the invention.

Embodiments of the invention will now be described, in which the data medium is assumed to be a recording medium, specifically a CD (compact disk), having video and audio signal data recorded thereon. In the following, such data representing original signals which are to be reproduced from the data medium will be referred to in general as the main data, to distinguish these from protection data, which are also conveyed by the data medium as described hereinafter. It will further be assumed that the original video and audio signals have been encoded by high-efficiency compression encoding using the MPEG1 algorithm, prior to recording. The MPEG1 algorithm is described for example in "International Standards for Multimedia Encoding", edited by Yasuda, published by the Maruzen company in Japan. FIG. 1 is a diagram for describing the general features of the reproduction protection method and reproduction protection apparatus.

Protection Information Provided on Recording Medium

The concept of medium protection data will first be described, referring to FIG. 1, in which data recorded on a CD (compact disk) 1 are read out from the disk to obtain an input signal for a demultiplexer 10 of a CD player 2, which is shown in block diagram form and which is configured to provide reproduction protection control in accordance with the present invention. The CD 1 has video and audio signals recorded thereon as digital data (referred to in the following as the main data), using MPEG1 compression encoding. Protection data, which are predetermined in accordance with the contents of the main data and will be referred to as the medium protection data, are also recorded on the CD 1. The medium protection data consist of information to be used in selectively restricting reproduction of the main data, as described hereinafter. The medium protection data can for example be recorded within the main code and sub-code header regions of the CD 1, or in the user region of the compressed data. The medium protection data expresses a protection level, referred to as the medium protection level, which can for example take values which successively increase in five steps, from 1 to 5, as shown in FIG. 2 and described hereinafter. In that case, the medium protection data can express the medium protection level by 3 bits. If separate medium protection levels are provided for the recorded video and audio data, then these can be expressed by two sets of 3 bits. The higher the number of the medium protection level, the greater is the degree of protection (i.e. the greater becomes the degree of restriction of reproduction of the recorded video or audio signal). The limitation of reproduction can for example by effected, in the case of video data, by operating on the playback data obtained from the CD1 such as to produce an output video signal, from the apparatus of FIG. 1 which will result in a mosaic pattern being produced within all or a specific region of a resultant displayed picture, as described hereinafter.

The medium protection level which is expressed by the medium protection data is predetermined in accordance with the wishes of the manufacturer or seller of the data medium (CD 1), or of the owner of the copyright for the main data. FIG. 3 shows two examples of medium protection data, each expressing 5 values of medium protection level. In the first example, limitation of reproduction is based upon the film classification system (i.e. movie ratings system) which is used in the U.S.A. In the case of a film which is rated "free", no restriction on reproduction is imposed by the medium protection data. If the movie is rated "PG" (i.e. parental guidance), then a moderate degree of restriction (protection level 1) is applied, and so on with increasing degrees of restriction for the "R" and "X" ratings. In the second example, limitation of reproduction is based on the rights of the copyright owner, providing successively increasing degrees of restriction of reproduction as the protection level increases from 1 to 5.

The medium protection data is a combination of data for expressing at least one medium protection level as described above, and protection position information which specifies the position (within the encoded main data) at which the protection is to be applied. It is an essential feature of the present invention that the medium protection data can assign the medium protection level in units of frames of the video signal. That is to say, limitation of reproduction of individual frames can be controlled. In addition, limitation of reproduction of one or more specific regions within a specific frame (or sequence of specific frames) can also be predetermined by the medium protection data. In that case, for example, a region formed of a number of fixed-size blocks of pixels can be converted to a blank region, or filled with a mosaic pattern, in the final display picture that is obtained from the output video signal from the apparatus of FIG. 1. That is to say, the protection position information can be used to specify not only a specific frame, but also to specify one or more specific regions within a frame.

Alternatively, the protection position information can specify an identical medium protection level for the entirety of each of a succession of video signal frames, or specify an identical medium protection level for one or more specific regions within each of a succession of frames.

The term "protection position information" is used here, since it may not be necessary to record explicit data constituting the protection position information on the CD1. Instead, that information can be inherently constituted by the positions at which respective medium protection data are located within the stream of compressed encoded main data that have been recorded on the CD 1. For example, the apparatus may be configured such that if the encoded data for a video signal frame are immediately preceded by a portion of medium protection data, then that indicates that the medium protection data portion is to be applied to that frame. If the medium protection data portion is to be applied to one or more regions within that frame, rather than the entire frame, then the medium protection data portion which immediately precedes the compressed encoded frame in the recorded data can include at least two values for each of these regions, for specifying the respective positions of the regions. In that case, explicit protection position information must be recorded as data on the CD 1, as part of the medium protection data.

Protection Information Generated by Reproduction Apparatus

With the method and apparatus of the present invention, a reproduction apparatus can be configured to produce predetermined protection data which are specific to that reproduction apparatus. For example, the CD 1 in FIG. 1 is played by a reproduction apparatus 2 which is provided with a presettable memory device which will be assumed to be a ROM (read-only memory) which generates apparatus protection data expressing a protection level referred to in the following as an apparatus protection level. The apparatus protection level is specified beforehand by the manufacturer or the seller of the reproduction apparatus. In the same way as for the medium protection data described above, the apparatus protection level can take a plurality of values, corresponding to respectively different degrees of limitation of reproduction of main data which are obtained from a data medium. It will be assumed that the number of apparatus protection level values is 4, i.e. from 1 to 4, so that the apparatus protection data can consist of two bits. The higher the apparatus protection level number, the greater becomes the degree of protection, i.e. the greater becomes the degree of reproduction limitation.

The contents of the apparatus protection data ROM cannot be rewritten by the user. In the embodiment of FIG. 1, each time that power to the apparatus is switched on, the apparatus protection data are read out from the ROM, and thereafter reproduction is executed in accordance with a combination of the apparatus protection level specified by the apparatus protection data and the medium protection level which is specified by the medium protection data.

FIG. 4 shows three examples of how the apparatus protection level can be assigned. In the first example, the apparatus protection level is preset in accordance with the country in which the reproduction apparatus is to be used. If the reproduction apparatus is to be used in the U.S.A. for example, then it is possible that the apparatus protection level could be set to a low value such as 1. In the case of a reproduction apparatus which is to be used in other parts of the world, such as Europe, Japan and Taiwan, which have varying degrees of restrictions on video software, the apparatus protection level could be set to higher values, as illustrated. In that way, video scenes which are not permissible in one country can be automatically eliminated (partially or completely), e.g. by insertion of mosaic pattern regions in the resultant display picture, by using the apparatus protection level and medium protection level in combination as described hereinafter.

With the second example in FIG. 4, the apparatus protection level is predetermined in accordance with the type of person who is expected to use the reproduction apparatus. If the reproduction apparatus is to be used only by adults, for example, then the apparatus protection level can be set at a low value such as 1. If the reproduction apparatus will be used by children, the apparatus protection level can be set to a high value such as 4. In that way, video scenes or audio content which are considered unsuitable for children can be partially or completely restricted from being reproduced.

With the third example in FIG. 4, the protection level that is set by the apparatus protection data is predetermined in accordance with the applications for which the reproduction apparatus will be used. For example if the reproduction apparatus is to be sold to the public, then the apparatus protection level can be set to a value such as 1 or 2, whereas if the reproduction apparatus is intended to be used for demonstration purposes in a shop, then the apparatus protection level can be set to a different value, i.e. 3 or 4, and the apparatus of FIG. 1 controlled such that only certain scenes which should be of interest to possible customers of the shop will be displayed. In that way, the apparatus protection level can be set in accordance with the application objectives of the reproduction apparatus.

The overall features of reproduction protection will now be described, referring to FIG. 1. Firstly, data recorded on the CD 1 are read out, as an input signal to the demultiplexer 10. The recorded data on the CD 1 consist of the compressed encoded main data (i.e. compressed encoded video and audio data) which are multiplexed with the medium protection data. The demultiplexer 10 separates the compressed encoded main data from the medium protection data, and supplies the medium protection data to a medium protection signal detection section 11 while supplying the compressed encoded main data to a video decoder section 15. As described hereinabove, the medium protection data may inherently specify protection position information, or may include explicit protection position information. The medium protection signal detection section 11 serves to detect the protection position information, and generates a corresponding protection position signal, which indicates those portions of the main data to which the medium protection data applies (e.g. specific video signal frames, and/or block regions within specific frames). The protection position signal is supplied to a protection control signal generating section 14. The medium protection signal detection section 11 is further responsive to the medium protection data for generating a corresponding medium protection signal, which expresses the medium protection level and is supplied to a final protection level determining section 13.

The final protection level determining section 13 basically consists of a matrix ROM in this embodiment, i.e. a ROM which stores a pattern of relationships between respective combinations of medium protection levels and apparatus protection levels and resultant final protection levels. The operation of the matrix ROM will be described referring to the matrix diagram of FIG. 2, which shows an example of how the contents of that ROM are read out in response to combinations of medium protection level and apparatus protection level values. There are five possible values (designated as A to E respectively) for the final protection level, successively increasing in degree of reproduction limitation in the sequence A, B, C, D, E. FIG. 2 shows an example of various values of the final protection level which are determined by respective combinations of values of the medium protection level and apparatus protection level, i.e. the values in the range A to E which are located at respective intersections between rows and columns of the matrix in FIG. 2. Thus for example if the medium protection level is 4 and the apparatus protection level is 2, then the final protection level will be B.

It is necessary to clearly distinguish between the ROM of the apparatus protection signal generating section 12 and the matrix ROM of the final protection level determining section 13. The contents of the ROM of the apparatus protection signal generating section 12 can be set in accordance with the requirements for a particular reproduction apparatus, whereas the contents of the matrix ROM of the final protection level determining section 13 will in general be common to a large number of reproduction apparatus units.

The final protection level determining section 13 generates an output signal, referred to as the final protection level signal, which expresses the final protection level that has been determined, and supplies that signal to the protection control signal generating section 14. In response to that signal, and the protection position signal, the protection control signal generating section 14 generates a signal referred to as the protection control signal, which is supplied to control a section which will be referred to as the video decoder section 15. For simplicity of description, only video signal reproduction will be considered at this stage, and the video decoder section 15 should be understood as a section which converts the compressed encoded video data (main data) from the demultiplexer 10 to a standard (analog) video signal. As the stream of compressed encoded main data flows into the video decoder section 15 from the demultiplexer 10, the protection control signal controls the video decoder section 15 such as to apply reproduction protection in accordance with the final protection level values, at the respective positions within that data flow which are specified by the protection position information. The video decoder section 15 thereby produces an output video signal which will result in video pictures in which reproduction of the main (video) data is limited in accordance with the final protection level values. As will be understood from the above, the final protection level values may change from frame to frame of the video signal, in accordance with changes in the medium protection level.

A first example of limitation of reproduction in accordance with the final protection level will be described, which is implemented by controlling the expansion and decoding of the main data by the video decoder section 15. The example will be described referring to the embodiment of FIG. 5, in which the reproduction apparatus is again a CD playback apparatus, designated by numeral 3. Only the operation with regard to the video data of the main data from the CD 1 will be described. In FIG. 5, a specific configuration for the video decoder section 15 of FIG. 1 is shown, made up of a variable-length decoding section 15a, a dequantizer section 15b, an inverse transform section 15c and a video reproduction control section 15d, with the compressed encoded video data being supplied from the demultiplexer 10 to the variable-length decoding section 15a and with the final output (analog) video signal being produced from the video reproduction control section 15d. In this embodiment, the video data have been recorded on the CD 1 after being subjected to compression by discrete cosine transform processing, and reproduction limitation is controlled by controlling the accuracy of inverse DCT (discrete cosine transform) processing which is effected by the inverse transform section 15c. The protection control signal which is produced from a protection control signal generating section 14a and supplied to control the inverse transform section 15c is derived based on the medium protection data and apparatus protection data, in combination, as described above for section 14 in FIG. 1, i.e. the protection control signal applies control in accordance with the final protection level.

The demultiplexed compressed encoded video data read from the CD 1 are subjected to variable-length decoding in the variable-length decoding section 15a, and then to dequantization in the dequantizer section 15b. The resultant compressed data are then subjected to inverse DCT processing in the inverse transform section 15c, with the transform processing being selectively modified in accordance with the protection control signal. The resultant decompressed data are then processed in the video reproduction control section 15d to obtain the final output video signal. The effect of reproduction limitation controlled by the protection control signal acting on the inverse transform section 15c is to selectively produce a degree of blurring or formation of a mosaic pattern within the pictures which are displayed using the final output video signal. Such a degree of blurring will be referred to as the visibility grade. An example of the relationship between the visibility grade and the final protection level values A to E (which are determined by the protection control signal generating section 14a as described hereinabove, and are expressed by the protection control signal) is shown in the leftmost column of FIG. 6. If the protection level is A, i.e. minimum limitation of reproduction of the video data, then the protection control signal is set to a state whereby it does not affect the operation of the inverse transform section 15c. If the protection level is B, then the protection control signal controls the inverse transform section 15c such as to operate on a block size of 8×8 picture elements (i.e. the same block size which was utilized in the original DCT processing), using the DC component value for each block, but using only two of the AC transform coefficients, with the values of all of the other transform coefficients being forcibly set to zero. This will result in a substantial lowering of resolution of a display picture that is produced based on the output video signal. If the protection level is C, then the protection control signal controls the inverse transform section 15c such as to operate on a block size of 8×8 picture elements of a video signal frame, using only the DC component for each block, (i.e. the DC component is the only transform coefficient used). In this case, since all of the picture elements within an 8×8 picture element block will have identical video signal values, this will result in a mosaic pattern being formed in the finally obtained picture. If the protection level is D, then the protection control signal controls the inverse transform section 15c such as to operate on a block size of 16×16 picture elements, using only the DC component values. This will again result in a mosaic pattern being formed, in which the blocks of the pattern are of larger size then for the case of protection level C, i.e. a mosaic pattern of macroblocks is formed, thereby further degrading the degree of visibility of the resultant picture. If the protection level is E, then the video data obtained from the inverse transform section 15c are replaced by different video data (produced from a source not shown in the drawing), which are produced from the video reproduction control section 15d as the final video signal, and which will produce a predetermined picture or pictures. Such a predetermined picture might for example display a warning message concerning copyright protection.

With the MPEG1 algorithm, a block size of 8×8 picture elements is used in the DCT processing. The transformed block is expressed by a DC component (i.e. DC coefficient) and a plurality of coefficients (the AC coefficients) which represent signal level values at respectively different successively increasing frequencies. Thus if for example the inverse transform section 15c is controlled such that only the DC coefficient and the two lowest-frequency AC coefficients are used, in the inverse DCT operation for each block, then a specific reduction in resolution of all (or a specific part) of the resultant display picture can be achieved in a very simple manner.

Similarly if only the DC component for a block is used in the inverse DCT processing, with all of the AC coefficients set to zero, then all of the signal level values for the picture elements of a block will be set to an identical value, in the resultant video signal obtained from the inverse DCT operation. Hence, a mosaic pattern can very easily be formed in the resultant picture that is obtained using the final output video signal. Moreover if, for each of respective 16×16 element macroblocks (i.e. each consisting of four 8×8 picture element blocks), only the DC coefficient for a specific one of the 8×8 element blocks is used (for example, the DC coefficient for the upper leftmost one of the 8×8 element blocks) in the inverse DCT processing for all of the four 8×8 element blocks constituting the 16×16 element macroblock, with all of the AC coefficients set to zero, then a mosaic pattern will be formed which is substantially coarser than the mosaic pattern which is formed by using the 8×8 element blocks.

It can thus be understood that with the above embodiment of the invention, applied to video data which have been subjected to high-efficiency compression encoding using a data transform operation, stepwise changes in a degree of restriction of reproduction of the video data can be easily accomplished by effecting stepwise changes in a degree of resolution of a finally obtained picture, or in a portion of that picture, and that such stepwise changes in resolution can be easily controlled in accordance with the final protection level which has been established based on the medium protection data and apparatus protection data. In particular, when such control is applied to the inverse DCT processing, it is possible to easily effect stepwise changes in the visibility grade, i.e. in the picture resolution, through use of unit blocks of picture element values which are basic to the transform processing. Such a type of control of the visibility grade, operating within each frame of the video signal, can be considered as applying protection in a (2-dimensional) spatial domain.

With a video data encoding method such as the DCT method, the output digital signal that is produced from the inverse DCT circuit consists of sequential sets of data, each consisting of successive picture element values for the respective picture elements of a unit block (e.g. a block of 8×8 picture elements) of a video signal frame. In order to convert such a digital signal into a normal digital video signal, it is necessary to first temporarily store the data produced from the inverse DCT circuit in a video memory (e.g. a frame memory), then to read out the video data in the correct sequence (i.e. as successive picture element values in successive picture scanning line intervals). That operation is the basic function of the video reproduction control section 15d in FIG. 5. FIG. 7 shows another embodiment of the invention, in which control for reproduction protection is applied to the video data which have been produced from the inverse transform section 15c, i.e. in which control by the protection control signal in accordance with the final protection level is applied to a video reproduction control section which is configured such as to respond appropriately to the protection control signal, and is designated as 15d'. Apart from this feature, the configuration and operation of this embodiment is identical to that of FIG. 5 described above. The video reproduction control section 15d' includes a frame memory, into which output data from the inverse transform section 15c are temporarily written, and then read out in the appropriate sequence as described above, to obtain the final output video signal.

In this embodiment, the degree of reproduction limitation is controlled by "thinning out" frames of the video data that are used to form the final output video signal, with the degree of "thinning out" being determined by the final protection level. That is illustrated by the central column in FIG. 6, in which such a type of control is referred to as time domain protection. In the example of FIG. 6, when the final protection level is A, then all of the frames of video data which are successively written into the frame memory of the video reproduction control section 15d' are used to form the final output video signal. If the final protection level is B, then the protection control signal from the protection control signal generating section 14b controls the video reproduction control section 15d' such that only one out of every 15 frames of video data supplied from the inverse transform section 15c is used to form the final output video signal. Specifically, one out of every fifteen frames of video data from the inverse transform section 15c is held stored in the frame memory of the video reproduction control section 15d' for fifteen successive frame periods, and is repetitively read out during that time, to form the final output video signal. Thus a type sample-and-hold operation is performed using the frame memory in the video reproduction control section 15d', whereby the finally obtained picture will change once in every 0.5 seconds. If the final protection level is C, then the video reproduction control section 15d' is controlled such that the contents of the frame memory are updated only once in every 60 frame periods, i.e. the finally obtained picture will change only once in every 2 seconds. If the final protection level is D, then only the video data of certain specific frames (or one specific frame) are written into the frame memory of the video reproduction control section 15d' and read out to obtain the final output video signal. In that way, for example, only a portion of the video data (e.g. a portion which is not subject to copyright protection) will be displayed. If the protection level is E, then the video data for a predetermined picture are written into the frame memory of the video reproduction control section 15d' and repetitively read out, to display only that predetermined picture, which can be for example a warning message concerning copyright protection.

Alternatively, control of the degree of reproduction limitation can be performed by arranging that the protection control signal from the protection control signal generating section 14b acts on the video reproduction control section 15d' such as to vary (in accordance with the final protection level) the number of gradations provided by each video data sample, i.e. to vary the number of amplitude levels that can be expressed by each sample. That can be performed by setting one or more low-order bits of each data sample to a fixed value, e.g. 0. For example if the LSB is always set to 0, then the number of possible gradations is reduced by half, and a corresponding lowering of resolution of the finally obtained display picture is achieved. The bits in each digital data sample which are not fixed in that way will be referred to in the following as the effective bits of the sample. Such gradation control based on the numbers of effective data bits is illustrated by the right-side column in FIG. 6. In that example, if the final protection level is A, then the protection control signal from the protection control signal generating section 14b has no effect on the operation of the video reproduction control section 15d', so that each video data sample used to form the output video signal has the standard number of effective bits, i.e. 8 bits. If the final protection level is B, then the protection control signal controls the video reproduction control section 15d' such that the number of effective bits/sample of the output video signal is reduced to 4 (i.e. by rounding-off the low-order 4 bits to zero). If the final protection level is C, then the protection control signal controls the video reproduction control section 15d' such that the number of effective bits/sample is 2 (i.e. all except the two high-order bits are set to zero), so that the picture resolution is further degraded. Similarly, if the final protection level is D, then the video reproduction control section 15d' is controlled such that the number of effective bits is reduced to 1. If the protection level is E, then the video data for a predetermined picture are written into the frame memory of the video reproduction control section 15d' and repetitively read out as the final output video signal, to display only that predetermined picture.

It would be equally possible, as indicated by the broken-line connection from the protection control signal generating section 14b to the dequantizer section 15b in FIG. 7, to arrange that the protection control signal from the protection control signal generating section 14b acts on the dequantizer section 15b such as to vary (in accordance with the final protection level) the number of effective bits of each output datum from the dequantizer section 15b. That will provide a similar effect to that described above for the case in which control is effected through the video reproduction control section 15d'.

Another method which may be used to control the degree of reproduction limitation is to apply the protection control signal from the protection control signal generating section 14b such as to control the variable-length decoding section 15a. In that case, the protection control signal is arranged to act on the variable-length decoding section 15a such that, as the protection level is increased from A to E, data having a long code length are set to zero, i.e. are ignored. This will result in a lowering of resolution in the final picture that is obtained from the output video signal.

It should be noted that reproduction limitation control can be executed by a combination of control acting along the time axis and control acting in a spatial domain (i.e. within individual frames). That point is illustrated conceptually in FIG. 8, in which successive vertical lines 20 represent sequential frames of the video signal that is recorded on the CD 1. (For simplicity of description, it will be assumed that the final protection level is identical to the medium protection level). Together with each video signal frame data portion on the CD 1, a medium protection data portion is recorded, which may include position information specifying a region within the frame within which display resolution is to be lowered, to a degree that is in accordance with the final protection level. In this example there are two possible basic display conditions for each frame, i.e. non-display or display (with one or more degraded resolution regions possibly being formed). To achieve this, the medium protection data assigned to each frame includes a 1-bit flag, whose 1 or 0 logic state designates either display or non-display for the frame. If that flag bit indicates that none of the frame is to be displayed, the condition is indicated by a "x" symbol in FIG. 8, while if the flag bit indicates that the frame is to be completely or partially displayed, that condition is indicated by a "o" symbol in FIG. 8. In the example of FIG. 8, a "o" condition is specified for each of the ten consecutive frames designated as $F_A$, indicating that each frame is to be displayed. In addition, the medium protection data of each of these frames includes position information for a degraded resolution region. The resultant display picture is designated by numeral 21, containing a degraded resolution region 22, which is rectangular and is shown as a hatched-line region. The degraded resolution region 22 is formed by a plurality of 16×16 element macroblocks, and for each of the frames $F_A$, the corresponding position information in the medium protection data specifies two addresses of macroblocks (designated as 22a and 22b, located at the upper left-side and lower right-side corners of the mosaic region 22) within the frame, to thereby specify the position and size of a rectangular region which is the degraded resolution region 22.

Similarly, a set of four successive frames $F_B$ is each to be displayed, but with a degraded resolution region formed in the final display picture, as indicated by numeral 24. In this case the degraded resolution region is formed of two adjoining rectangular regions, so that it is necessary for the position information in the medium protection data to specify the positions of two pairs of macroblocks within the frame, i.e. the pair of addresses of macroblocks 24a, 24b and the pair of addresses of macroblocks 24c, 24d in FIG. 8.

It can thus be understood that in this case, reproduction protection is applied by a combination of control with respect to the time axis, and control with respect to (2-dimensional) space within each frame. It can be further understood that the invention enables extremely precise control of reproduction limitation, which is determined in accordance with the final protection level.

Figure 9:
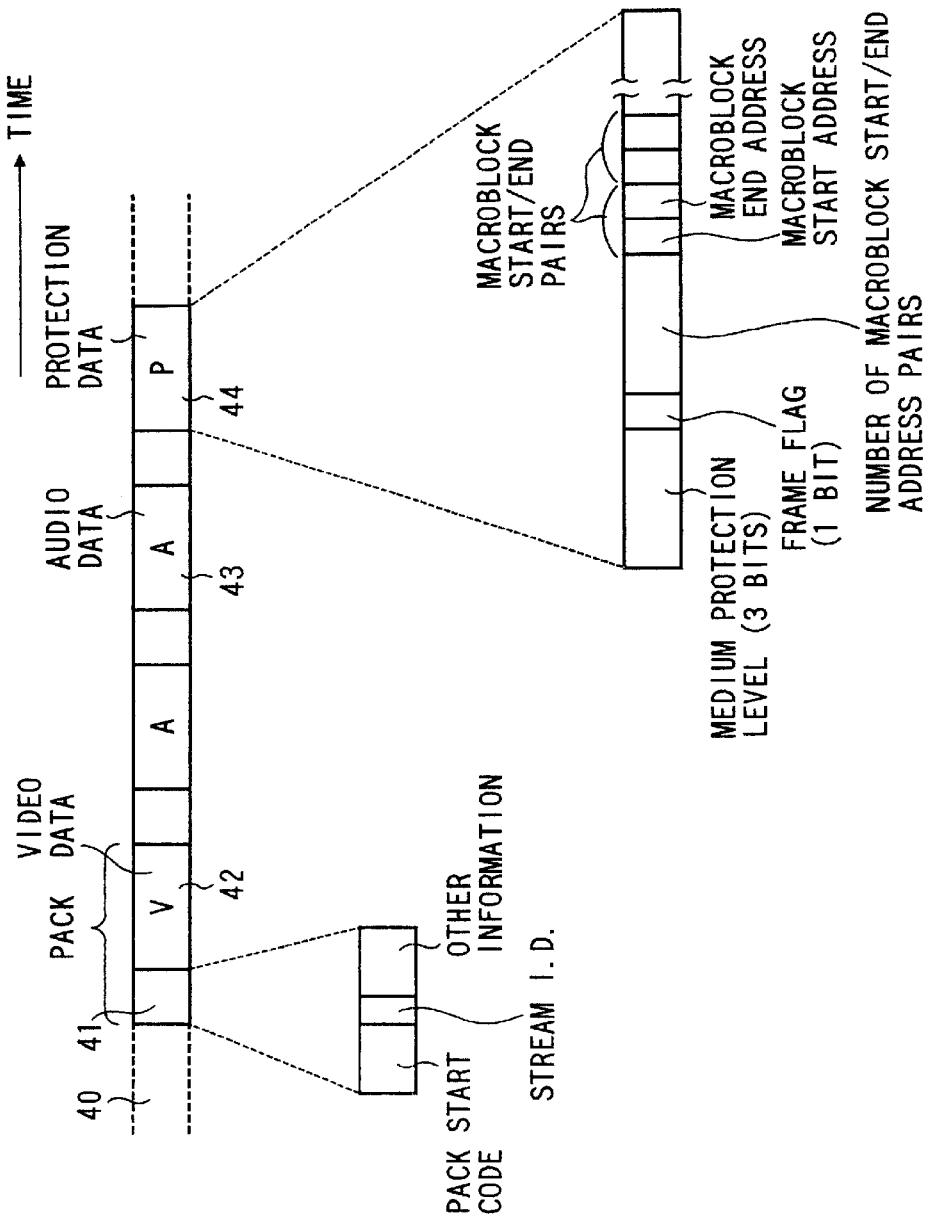
FIG. 9 is a diagram for describing how video, audio and protection data can be conveyed in a data stream in accordance with the MPEG1 standards.

With data transmission in accordance with the MPEG1 system (i.e. based on the ISO-11172-3 standards), data are transmitted as successive packs of data, which are time-division multiplexed, as illustrated by the data flow 40 shown in FIG. 9. Each pack is made up of a leading portion such as the portion 41, which contains information including a pack start code and a stream identifier which distinguishes the data conveyed by that pack from that of other packs (e.g. to distinguish between video, audio or other data), and a main data portion such as portion 42. In this example each main portion consists of either compressed encoded video data such as portion 42, encoded audio data such as portion 43, or protection data such as portion 44. In this example it will assumed that protection of the form shown in FIG. 8 is applied to the video data, so an individual protection data portion may be assigned to each of a plurality of video signal frames, i.e. video data frames can be conveyed by respective packs, each preceded by a protection data pack. In that case, each protection data pack in the example of FIG. 9 consists of a 3-bit portion which specifies the medium protection level, a 1-bit frame flag specifying whether or not the frame is to be displayed (as described above for FIG. 8), a portion which specifies the number of macroblock start/end address pairs (to be utilized when at least one degraded resolution region is to be formed within the frame, e.g. as for each of the frames $F_A$ and $F_B$ in FIG. 8), followed by the pairs of macroblock start/end addresses (e.g. the pair of addresses of macroblocks 24a, 24b, then the pair of addresses of macroblocks 24c, 24d, for each of the frames $F_B$ in the example of FIG. 8).

Figure 10:
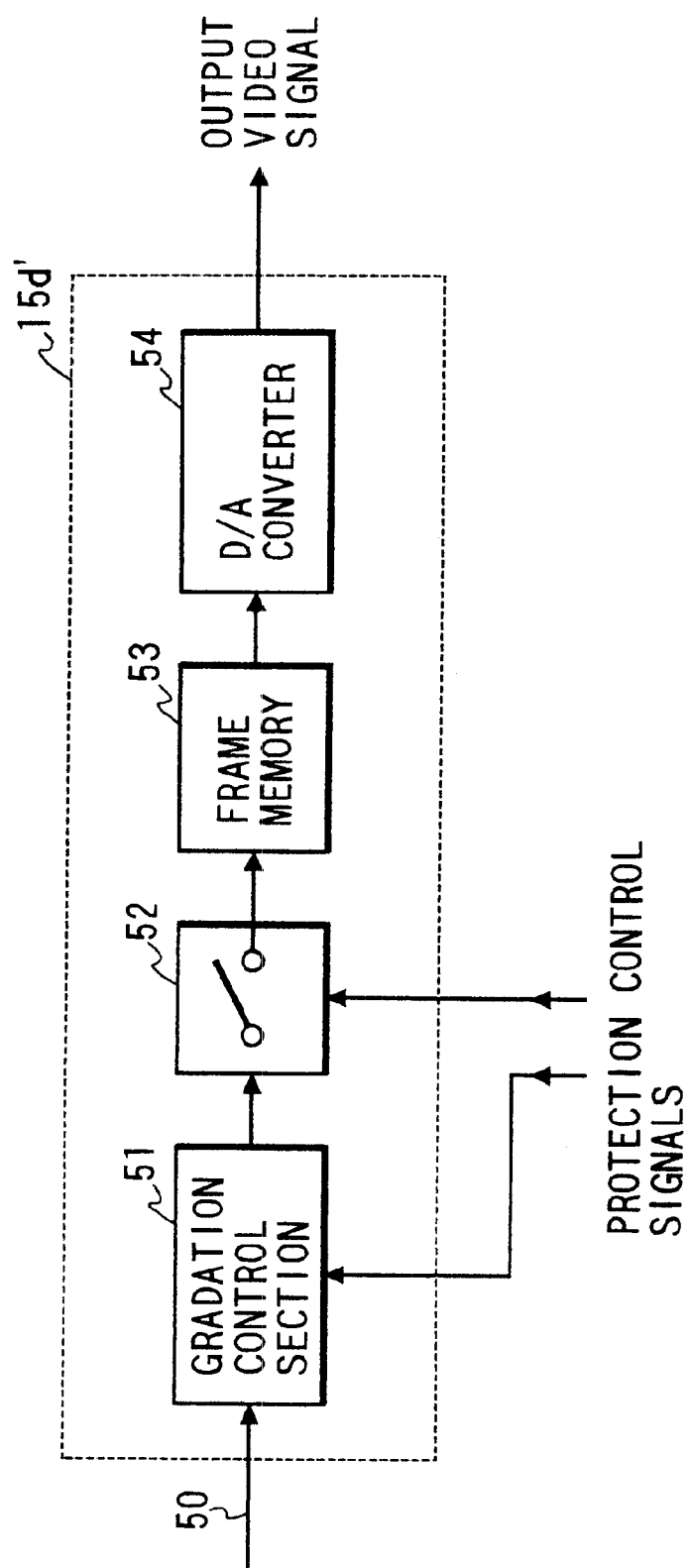
FIG. 10 is a block diagram of an example of the internal configuration of a video reproduction control section in the embodiment of FIG. 7.

FIG. 10 shows a specific internal configuration for the video reproduction control section 15d' of the embodiment of FIG. 7. In FIG. 10, the output data from the inverse transform section 15c are supplied via a line 50 to a gradation control section 51, which is controlled by one of two protection control signals that are generated from the protection control signal generating section 14b, and resultant output data from the gradation control section 51 are transferred through a switch 52, which is controlled by the other one of the protection control signals. Data transferred through the switch 52 are written into a frame memory 53, and are subsequently read out from the frame memory 53 in the appropriate sequence to constitute successive frames of the original video signal. The digital video signal thereby produced from the frame memory 53 is supplied to a digital/analog converter 54, to obtain an analog video signal as the final output signal. So long as the switch 52 is held closed, the contents of the frame memory 53 will be completely updated once in each frame period of the video signal, so that data of a new frame will be sequentially read out from the frame memory 53. However if the switch 52 is held closed during an integral number of frame intervals, then the most recently stored contents of the frame memory 53 will be repetitively read out during each of these frame intervals, i.e. the last frame will be continuously outputted. It will thus be apparent that this circuit can implement the time-axis protection operation described above on successive frames, if the switch 52 is controlled in accordance with the status of the frame bit that is contained in the medium protection data.

The gradation control section 51 operates on each digital video signal sample (in general, each 8-bit datum) that is supplied from the inverse transform section 15c, to set the low-order bits of each sample in accordance with the final protection level. For example referring to the right-side column in FIG. 6, if the final protection level is B, then the gradation control section 51 sets all of the four low-order bits of each sample to a predetermined value, e.g. 0. If the protection level is D, then all of the seven low-order bits of each sample are set to 0.

If reproduction restriction is to be applied within a video signal frame, then the protection control signal generating section 14b responds to the protection position signal such as to apply the above-mentioned protection control signal to the gradation control section 51 during one or more specific time intervals within the corresponding frame interval, with each of these specific time intervals being determined based on one of the macroblock start/end address pairs which are shown in FIG. 9, described above. In that way, reproduction limitation can be applied within specific regions of a frame, as illustrated in FIG. 8, i.e. the spatial-domain protection operation described above can be applied.

It will be understood that in practical terms, each "start address" will define a time-axis position, within a frame period, of the data sample corresponding to an uppermost left-side pixel of a rectangular region within the frame, while the "end address" similarly defines the position of a data sample corresponding to a lowermost right-side pixel of that region. Such time relationships can be readily established by well-known techniques for operating on a digital video signal, so that detailed description is omitted.

In the above embodiments, only reproduction protection of video data has been described. FIG. 11 shows another embodiment of the invention, in which reproduction protection of both audio and video data is applied. Only the points of difference between this embodiment and previous embodiments will be described. A CD reproduction apparatus 5 of this embodiment differs from that of FIG. 7 by including circuits for decoding and dequantizing an encoded digital audio signal that has been recorded on the CD 1, by an audio decoding section made up of a variable-length decoding section 16a, a dequantizer section 16b, a sub-band combining section 16c and an audio reproduction control section 16d. The compressed encoded audio data are separated from the video and protection data contained in the input data stream, by the demultiplexer 10, and are supplied as input data to the variable-length decoding section 16a, with an output audio signal being produced from the audio reproduction control section 16d. This embodiment further differs from that of FIG. 7 in that the protection control signal generating section 14c of this embodiment produces not only a first protection control signal which acts on either the video reproduction control section 15d' or dequantizer section 15b to apply video signal reproduction protection by varying the number of bits per datum, as described hereinabove for the protection control signal of the embodiment of FIG. 7, but also a second protection control signal which acts on the audio reproduction control section 16d or dequantizer section 16b to apply audio signal reproduction protection, as described in the following. For simplicity of description, it will be assumed that the second protection control signal is produced in accordance with the final protection level that is derived for reproduction protection of the the video data, as described hereinabove. However in general, separate medium protection levels and separate apparatus protection levels would be specified for the video and audio data, i.e. to obtain separate final protection levels for video and audio data.

FIG. 12 is a table illustrating three possible methods of applying audio signal reproduction protection with the embodiment of FIG. 11. With each of the three examples shown in FIG. 12, five different audibility grades can be selected for the output audio signal produced from the audio reproduction control section 16d, in accordance with the final protection level, to effect audio signal reproduction protection. Firstly, the method illustrated by the leftmost column in FIG. 12 will be described. In this case, audio signal reproduction protection is applied by selectively restricting the bandwidth of the output audio signal produced from the audio reproduction control section 16d in accordance with the final protection level. If MPEG1 audio signal compression is used, then assuming a sampling frequency of 48 KHz, a bandwidth of 24 KHz is available for the output audio signal. In this example, if the final protection level is A, then no bandwidth restriction is applied, i.e. the audio bandwidth is 24 KHz. If the final protection level is B, then the audio signal bandwidth is restricted to 18 KHz, if the protection level is C the bandwidth is restricted to 12 KHz, if the protection level is D the bandwidth is restricted to 6 KHz, and if the protection level is E then no audio output signal is produced.

Since MPEG1 audio compression utilizes sub-band encoding with 32 bands, such bandwidth restrictions can be effected by causing the second protection control signal to act on the dequantizer section 16b such as to set the inverse quantization values corresponding to certain high-frequency bands to zero. Thus, audio reproduction protection by bandwidth control can be easily implemented.

A second method of audio signal reproduction protection will be described referring to the central column in FIG. 12. In this case, time-axis protection is applied, by "thinning-out" of audio signal sample values that are supplied from the sub-band combining section 16c and used in the audio reproduction control section 16d to obtain the output audio signal. In this example, if the final protection level is A, then all of the audio sample values are used in deriving the output audio signal. If the final protection level is B, then one in every two samples is held for two consecutive sample periods, by a sample-and-hold circuit, i.e. only half of the total samples are used in deriving the output audio signal. If the protection level is C, then only one in every three samples is used in deriving the output audio signal, i.e. one in every three successive samples is held for three consecutive sample periods. If the protection level is D, then only samples which occur during a specified interval are used in producing the output audio signal. For example, this operation could be performed when only a specified part of the recorded audio signal is to be allowed (by the copyright owner) to be reproduced. If the final protection level is E, then no audio output signal is produced.

A third method of audio signal reproduction protection will be described referring to the rightmost column in FIG. 12. In this case, protection control is executed by effecting control of the number of gradation levels provided by the audio data samples, in a similar manner to that described hereinabove for the video data. Generally, a digital audio signal has 16 bits/sample. When the final protection level is A, then all of these 16 bits are utilized, i.e. there is no limitation of audibility. If the final protection level is B, then the number of effective bits/sample is reduced to 12 (i.e. the low-order 4 bits of each 16-bit sample are fixed at 0), causing a lowering of quality of the reproduced audio signal. If the protection level is C, the number of effective bits is further reduced to 8, if the final protection level is D then the number of effective bits/sample is reduced to 4, and if the final protection level is E, then no audio output signal is produced.

It can thus be understood that the invention enables precise limitation of reproduction of a recorded audio signal together with limitation of reproduction of the recorded video signal, in accordance with a combination of medium protection data and apparatus protection data.

FIG. 13 shows an example of the internal configuration of the audio reproduction control section 16d of this embodiment. For the purpose of description, it is assumed that each of the above-mentioned three methods of protection control of the audio reproduction control section 16d is utilized, although in practice only one of these could be utilized. The circuit consists of a digital low-pass filter 61 which receives the output data samples from the sub-band combining section 16c via an input line 60, a sample-and-hold circuit 62 which can be controlled to hold and output each data sample for a specific interval, a gradation control section 63 which effects the aforementioned control of low-order bits of each audio data sample, to thereby control the gradation levels which can be expressed by each sample, a memory 64 for temporarily holding successive data samples, and a digital-to-analog converter 65 for converting the digital audio data to an analog audio signal. The gradation control section 63 is controlled by a protection control signal to provide varying degrees of gradation in accordance with the final protection level that has been determined for the audio data, by setting varying numbers of low-order bits of each 16-bit audio data sample to a fixed value as described above.

As shown, the protection control signal can also be applied to control the sample-and-hold circuit 62, to effect the above-described method of reproduction protection control utilizing sample-and-hold processing of the audio data samples. Similarly, the protection control signal can be applied to control the LPF 61, to achieve reproduction protection control by varying the bandwidth of the audio signal. It will be clear that a simpler circuit configuration can be utilized that that shown in FIG. 13, if only one of the above three methods of protection control is applied.

In each of the embodiments described above, there is a fixed relationship pattern between combinations of the protection levels which can be expressed by the medium protection data and the protection levels which can be expressed by the apparatus protection data, and the respective final protection levels which are thereby obtained, i.e. the relationship pattern which is stored in the matrix ROM of the final protection level determining section 13, an example of which is shown in FIG. 2. However in some cases there may be a requirement for enabling such a relationship pattern to be selected from a number of different relationship patterns, which have varying degrees of protection severity. Specifically, it may be advantageous to provide the reproduction apparatus with a switch which can be operated by the person who is in charge of the reproduction apparatus, such that the switch can be used to select from a plurality of different relationship patterns, so that the degree of reproduction protection can be flexibly determined by that person. In that way, the person in charge of the reproduction apparatus can ensure that the reproduction protection will be appropriate for the viewing audience. For example, an adult can set the switch such as to ensure that unsuitable scenes cannot be viewed by any children who may use the reproduction apparatus. In that case, assuming for example that the relationship pattern which is the least severe is that shown in FIG. 2, the entire range of possible relationship patterns is illustrated in the table of FIG. 14. Here, for each combination of protection levels obtained from the medium protection data and apparatus protection data, there is a corresponding range of one or more possible values of final protection level, with that range extending from a least severe value to the most severe value (i.e.

protection level E). One method of implementing such a capability would be to provide a plurality of matrix ROMs (or to define a plurality of separate matrix regions in a ROM), for storing the respectively different relationship patterns. However an embodiment of the invention will now be described whereby such a capability can be easily implemented by a simple modification of any of the embodiments of the invention that have been previously described.

The embodiment, which is a modification of the embodiment of FIG. 5, is shown in FIG. 15. The embodiment differs from that of FIG. 5 in being provided with a severity modification circuit 30 and a severity modification setting switch 31. The severity modification circuit 30 is connected between the final protection level determining section 13 and the protection control signal generating section 14a, and functions to selectively modify each protection level value which is read out from the matrix ROM of the final protection level determining section 13 (as described hereinabove for the embodiment of FIG. 5), and to supply a resultant modified final protection level to the protection control signal generating section 14a. The severity modification setting switch 31 can be adjusted by the person who is in charge of the CD player, to select one of five possible switch conditions which will be designated as $P_A$ to $P_E$, respectively. The severity modification setting switch 31 is coupled to control the severity modification circuit 30 such that the severity modification circuit 30 executes protection level modification in accordance with the specific position at which the switch is set, as described in the following.

The relationships between the five possible values of the medium protection level (determined by the medium protection signal detection section 11 as described hereinabove) and the five positions $P_A$ to $P_E$ of the severity modification setting switch 31, are shown for each of the four possible values of the apparatus protection level (determined by the apparatus protection signal generating section 12), in diagrams (A) to (D) in FIG. 16. Referring first to diagram (A), if the switch position is $P_A$, then the relationship between the medium protection level values, the apparatus protection level values and the final protection level values is left unchanged from those of the corresponding column in FIG. 2, i.e. this setting of the severity modification setting switch 31 provides the least severe degree of reproduction protection. If the switch position is set to $P_B$, then the least severe value which can be taken by the modified final protection level becomes level B. That is to say, if a protection level A is established by the final protection level determining section 13, that is changed by the severity modification circuit 30 to a modified final protection level B. If the switch position is $P_C$, then the least severe value of the modified final protection level is changed to C. If the switch position is $P_D$, then the least severe value of the modified final protection level is changed to D, and if the switch position is $P_E$, then the modified final protection level is fixed as E.

The same is true for each of the apparatus protection level values 2, 3 and 4, as illustrated in diagrams (B), (C) and (D) in FIG. 16, which correspond to the second, third and fourth columns in FIG. 2 respectively.

It will be apparent that the severity modification circuit 30 can be easily configured using a logic circuit, which implements a simple algorithm in accordance with the setting of the severity modification setting switch 31, i.e. the algorithm would begin:

[If the severity modification switch 31 is set at $P_A$, transfer the protection level value established by the final protection level determining section 13 directly to the protection control signal generating section 14a, as the final protection level.

If the severity modification switch 31 is set at $P_B$, and if the protection level value established by the final protection level determining section 13 is level A, change that to level B and transfer to the protection control signal generating section 14a as the (modified) final protection level. Otherwise, transfer the protection level value produced from the final protection level determining section 13 unchanged, as the final protection level.

If the severity modification switch 31 is set at $P_C$, and if the protection level established by the final protection level determining section 13 is level A or level B, change to level C, and transfer to the protection control signal generating section 14a as the final protection level. Otherwise, transfer the protection level established by the final protection level determining section 13 unchanged, as the final protection level . . . ], and so on.

Thus with this embodiment, if the severity modification setting switch 31 is set to its least severe position ($P_A$), then the relationship pattern between combinations of the medium protection level and reproduction apparatus protection level values will be as shown in FIG. 2. If the severity modification setting switch 31 is set to the most severe position ($P_E$), then the relationship pattern will be such that the final protection level will always be the highest level, i.e. level E. As the severity modification setting switch 31 is successively changed from positions $P_A$ to $P_E$, the least severe degree of reproduction restriction (within the range of possible degrees of restriction which can be set by the final protection level) is increased to a more severe degree, by successive steps.

For example if the apparatus protection level is 2 and the medium protection level is 4, then the final protection level will be B. However by altering the setting of the severity modification setting switch 31, the user can change the final protection level to a higher value, in the range B to E. Hence with this embodiment, although protection level values can be specified by the manufacturer or copyright owner of the recording medium, and by the manufacturer or seller of the reproduction apparatus, the final degree of protection can be determined by the person who is in charge of the reproduction apparatus. Such a feature is highly useful.

As can be understood from the above description of embodiments, the invention enables a final protection level to be established, for controlling reproduction of recorded or transmitted video or audio signals, with that final protection level being determined based on a combination of protection levels which are respectively separately established by the manufacturer or copyright owner of recorded signals (or broadcaster of transmitted signals, or copyright owner of transmitted signal) and by the manufacturer or seller of the reproduction apparatus. The final protection level can be applied such as to achieve extremely precise protection of reproduction, whereby for example specific frames of a video signal, and/or specific regions within a frame, can be protected by restricting reproduction, with the degree of restriction being variable in a stepwise manner. The invention can at the same time provide corresponding protection of an audio signal which is being reproduced in conjunction with a video signal.

Although the invention has been described in the above with reference to a CD player apparatus, it will be understood that the invention is not limited in any way to such an apparatus, and is in general applicable to reproduction protection in any type of apparatus which reproduces a recorded or transmitted video and/or audio signal.

We claim:

1. A decoding apparatus providing decoding protection, for operating on information which is transferred through a medium and comprises main data which are to be decoded, the apparatus comprising:

means for detecting protection data which are also transferred through said medium;

means for generating apparatus protection data which comprise at least first apparatus protection data and second apparatus protection data, wherein said first apparatus protection data are specific to a region or a country in which said decoding apparatus is to be used, said first apparatus protection data being fixed and unmodifiable by a user of said decoding apparatus and said second apparatus protection data being modifiable by the user to selectively define a plurality of protection levels including at least two levels which are respectively specific to adults and to children;

means for defining a protection level based on said protection data and on said apparatus protection data, in combination; and means for executing decoding of said main data in accordance with said protection level, wherein the combination of said protection data and said first apparatus protection data specifies that said main data are decoded either in their entirety or not at all, and the combination of said protection data and second apparatus protection data specifies that said main data are decoded in their entirety, partially, or not at all, wherein, for each combination of protection levels based on said protection data and said apparatus protection data, there is a corresponding range of one or more possible values of final protection level, said corresponding range extending from a least severe value to a most severe value.

2. A decoding apparatus as recited in claim 1, wherein said means for executing operates in response to said combination of said protection data and said first apparatus protection data to cause said decoding apparatus to decode said main data either in their entirety or not at all, said means for executing operating in response to said combination of said protection data and said second apparatus protection data to cause said decoding apparatus to decode said main data in their entirety, partially, or not at all.

3. A decoding apparatus in accordance with claim 2, wherein said means for executing further operates in response to a value of final protection level between the least severe value and the most severe value in accordance with said combination of protection levels.

4. A decoding apparatus in accordance with claim 1, wherein said means for executing decoding of said main data further comprises means for executing decoding of said main data in accordance with a value of final protection level between the least severe value and the most severe value in accordance with said combination of protection levels.

* * * * *